United States Patent
Lee et al.

(10) Patent No.: US 9,344,336 B2
(45) Date of Patent: May 17, 2016

(54) SYSTEM AND METHOD FOR MANAGING VIRTUAL LINK STATE (71) Applicant: DELL PRODUCTS L.P., Round Rock, TX (US)

(72) Inventors: Sam J. Lee, Round Rock, TX (US); Anoop Ghanwani, Rocklin, CA (US); Thomas Kelley Chenault, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 205 days.

(21) Appl. No.: 14/054,590

(22) Filed: Oct. 15, 2013

(65) Prior Publication Data
US 2015/0103677 A1 Apr. 16, 2015

(51) Int. Cl.
H04L 12/24 (2006.01)
H04L 12/26 (2006.01)

(52) U.S. Cl.
CPC ........ H04L 41/0896 (2013.01); H04L 12/2697 (2013.01); H04L 43/50 (2013.01)

(58) Field of Classification Search
None
See application file for complete search history.

(56) References Cited

U.S. PATENT DOCUMENTS

| 8,634,328 | B2 * | 1/2014 | Mishra | H04L 41/5038 370/247 |
| 2007/0174851 | A1 * | 7/2007 | Smart | G06F 3/0605 719/324 |
| 2008/0140824 | A1 * | 6/2008 | Jain et al. | 709/224 |
| 2008/0275573 | A1 * | 11/2008 | Shimba | G05B 15/02 700/19 |
| 2009/0109841 | A1 * | 4/2009 | Nozaki et al. | 370/218 |
| 2009/0190469 | A1 * | 7/2009 | Kimura | H04J 3/14 370/225 |
| 2011/0134925 | A1 * | 6/2011 | Safrai et al. | 370/395.53 |
| 2011/0274114 | A1 * | 11/2011 | Dhar et al. | 370/401 |
| 2012/0093035 | A1 * | 4/2012 | Kidambi et al. | 370/255 |
| 2012/0163164 | A1 * | 6/2012 | Terry et al. | 370/221 |
| 2012/0177042 | A1 * | 7/2012 | Berman | 370/392 |
| 2012/0185846 | A1 * | 7/2012 | Recio et al. | 718/1 |
| 2013/0060940 | A1 * | 3/2013 | Koponen et al. | 709/225 |
| 2013/0205053 | A1 * | 8/2013 | Harriman et al. | 710/105 |
| 2014/0192817 | A1 * | 7/2014 | Sait et al. | 370/400 |
| 2015/0370315 | A1 * | 12/2015 | Unnikrishnan | G06F 13/4282 713/323 |

OTHER PUBLICATIONS

Dell Products, "Enhancing Scalability Through Network Interface Card Partitioning," White Paper, www.dell.com/downloads/global/products/pedge/en/Dell-Broadcom-NPAR-White-Paper.pdf , Apr. 2001, 6 pages.

* cited by examiner

Primary Examiner — Chi H Pham
Assistant Examiner — Vladislav Agureyev
(74) Attorney, Agent, or Firm — Haynes & Boone LLP (57) ABSTRACT A system and method of managing virtual link state includes receiving, at a first device, a first status update associated with the virtual link from a second device. The first status update includes a first management status value (RM) and a first operational status value (RO). The system and method further includes determining a second management status value (LM) associated with the first device, determining a second operational status value (LO) based on the first status update and the RM, transmitting a second status update for the virtual link to the second device, the second status update including the LM and the LO, and determining a state of the virtual link based on the RM, the RO, the LM, and the LO. The first device is configured to be coupled to the second device using a physical network link partitioned into a plurality of first virtual links including the virtual link.

18 Claims, 4 Drawing Sheets

SYSTEM AND METHOD FOR MANAGING VIRTUAL LINK STATE

BACKGROUND

The present disclosure relates generally to information handling systems, and more particularly to management of link state in virtual links.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Additionally, some embodiments of information handling systems include non-transient, tangible machine-readable media that include executable code that when run by one or more processors, may cause the one or more processors to perform the steps of methods described herein. Some common forms of machine readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Today's computer networks and information handling systems are being asked to handle ever increasing amounts of data and network traffic. In order to handle this increasing workload, network infrastructures continue to scale upward by incorporating network links of higher and higher capacity. This allows the networks and information handling systems to handle high-bandwidth applications that support multimedia content, virtualization, cloud computing, and/or the like. Unfortunately, use of high-capacity network links may introduce inefficiencies as not all applications and/or network traffic may be able to effectively utilize the entire bandwidth of the high-capacity network links. This further complicates the management of the high-capacity network links as it is possible for larger numbers of applications to utilize each of the network links.

One potential solution for improved management and utilization of high-capacity network links is by creating virtual partitioning of the network links. In virtual partitioning, the physical network link is split into separate virtual links, which is sometimes referred to as network interface card (NIC) partitioning. Each of the separate virtual links may be partially managed separately allowing the bandwidth and other resources of the high-capacity network link to be allocated among the separate virtual links. However, because the separate virtual links are implemented on the physical high-capacity network link, separate management of all aspects of the virtual links may be difficult. For example, in many virtual partitioning implementations, management of link state in the separate virtual links is generally handled in aggregate based on the state of the underlying physical network link.

Accordingly, it would be desirable to provide improved management of virtual link state.

SUMMARY

According to one embodiment, a method of managing a virtual link in a first device includes receiving a first status update associated with the virtual link from a second device. The first status update includes a first management status value and a first operational status value. The method further includes determining a second management status value associated with the first device, determining a second operational status value based on information associated with the first status update and the second management status value, transmitting a second status update for the virtual link to the second device, the second status update including the second management status value and the second operational status value, and determining a state of the virtual link based on information associated with the first management status value, the first operational status value, the second management status value, and the second operational status value. The first device is configured to be coupled to the second device using a physical network link. The physical network link is configured to be partitioned into a plurality of first virtual links. The plurality of first virtual links include the virtual link.

According to another embodiment, a computing device includes one or more processors, a memory coupled to the one or more processors, a first driver stored in the memory and being executed by the one or more processors, and a network port configured to couple the computing device to a remote device using a physical network link. The physical network link is configured to be partitioned into a plurality of first virtual links including a second virtual link. The first driver is configured to receive a remote status update associated with the second virtual link from the remote device. The first status update includes a remote management status value and a remote operational status value. The first driver is further configured to receive a local management status value associated with the computing device, determine a local operational status value based on information associated with the remote status update and the local management status value, transmit a local status update for the second virtual link to the remote device, the local status update including the local management status value and the local operational status value, and determine a state of the second virtual link based on information associated with the remote management status value, the remote operational status value, the local management status value, and the local operational status value.

According to yet another embodiment, an information handling system includes a first computing device, a second computing device, and a physical network link. The first computing device includes one or more first processors, a first memory coupled to the one or more first processors, a first driver stored in the first memory and being executed by the one or more first processors, and a first network port. The second computing device includes one or more second processors, a second memory coupled to the one or more second processors, a second driver stored in the second memory and being executed by the one or more second processors, and a second network port. The physical network link couples the first network port and the second network port. The physical network link is configured to be partitioned into a plurality of first virtual links including a second virtual link. The first driver is configured to transmit a first status update associated with the second virtual link. The first status update includes a first management status value and a first operational status value. The second driver is configured to receive the first status update, receive a second management status value associated with the second computing device, determine a second operational status value based on information associated with the first status update and the second management status value, transmit a second status update for the second virtual link to the second computing device, the second status update including the second management status value and the second operational status value, and determine a state of the second virtual link based on information associated with the first management status value, the first operational status value, the second management status value, and the second operational status value.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

For purposes of this disclosure, an IHS may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an IHS may be a personal computer, a PDA, a consumer electronic device, a display device or monitor, a network server or storage device, a switch router or other network communication device, or any other suitable device and may vary in size, shape, performance, functionality, and price. The IHS may include memory, one or more processing resources such as a central processing unit (CPU) or hardware or software control logic. Additional components of the IHS may include one or more storage devices, one or more communications ports for communicating with external devices as well as various input and output (I/O) devices, such as a keyboard, a mouse, and a video display. The IHS may also include one or more buses operable to transmit communications between the various hardware components.

Figure 1:
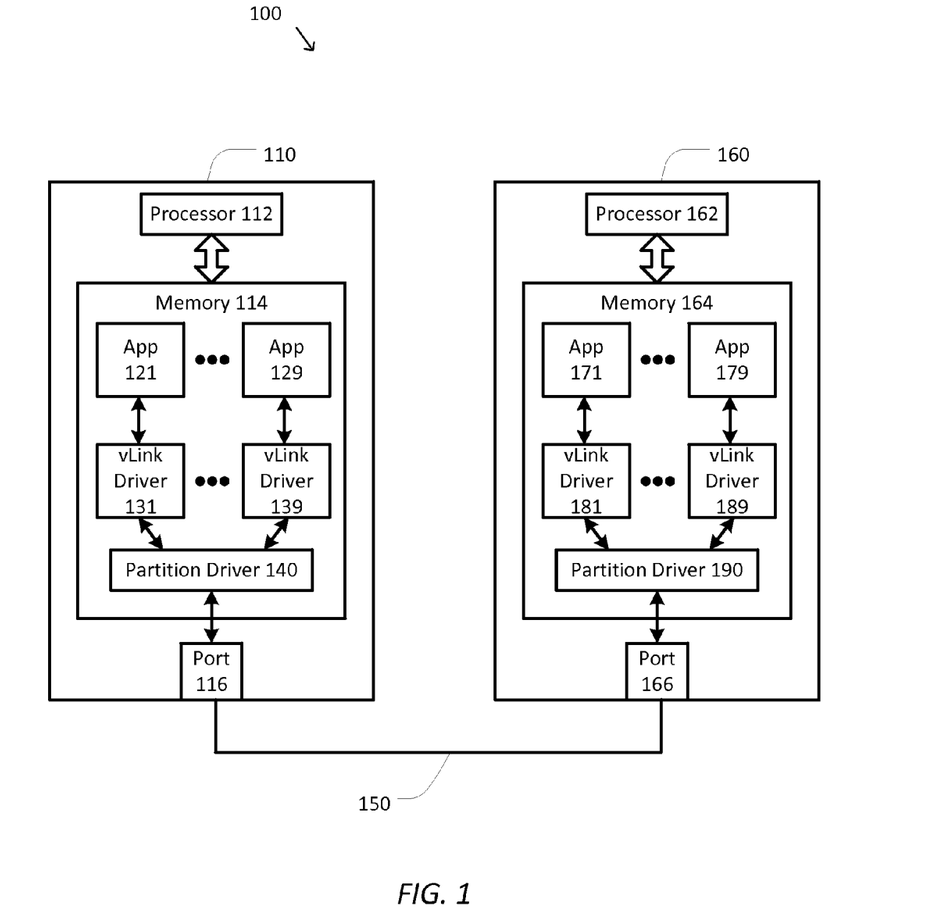
FIG. 1 shows a simplified diagram of a networked environment according to some embodiments.

FIG. 1 shows a simplified diagram of a networked environment 100 according to some embodiments. As shown in FIG. 1, networked environment 100 includes two representative computing devices 110 and 160. And although FIG. 1 shows only two computing devices 110 and 160 in networked environment 100, it is understood that networked environment 100 may include any number of computing devices with additional components, drivers, and interconnections similar to those discussed below with respect to computing devices 110 and 160. In some examples, computing devices 110 and 160 may be any kind of network devices including end stations, servers, PCs, networked computing devices, switches, routers, bridges, and/or the like. In some examples, computing device 110 may be an end station and computing device 160 may be a switch.

Computing device 110 includes one or more processors 112 and memory 114. The one or more processors 112 are coupled to the memory 114 and may control the operation of computing device 110. In some examples, the one or more processors 110 may be any type of central processing unit, microprocessor, microcontroller, multi-core processor, and/or the like. In some examples, the one or more processors 110 may be a virtual processor of a virtual machine and/or a virtual environment. Computing device 110 further includes a least one network port 116 coupling computing device 110 to at least one other computing device using a network link. In some examples, the network link may be part of a local area network (LAN), such as an Ethernet, and/or even part of a wide area network (WAN), such as an Internet.

Memory 114 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Memory 114 may be used to store various software components that may be executed by the one or more processors 112. Memory 114 may further store variables and/or data structures being manipulated by the software components. As shown in FIG. 1, memory 114 includes storage for a plurality of applications 121-129, a plurality of virtual link drivers 131-139, and a partition driver 140. Each of the applications 121-129 is a generic representation of any software and/or hardware and software application using network resources. In some examples, any of the applications 121-129 may include one or more drivers located in the network stack above a corresponding virtual link driver selected from virtual links drivers 131-139. In some examples, any of the applications 121-129 may include iSCSI drivers, FCoE, drivers, and/or the like. In some examples, any of the applications 121-129 may include the software and/or firmware of a switching device, such as a switch, a router, a bridge, and/or the like, that handle the forwarding or similar function in computing device 110. In some examples, any of the applications 121-129 may operate in a virtual machine and/or a virtual environment. In some examples, any of the applications 121-129 may provide networking services to other applications (not shown) being executed on computing device 110. Although only two applications are shown among the applications 121-129, any reasonable number of applications may be stored in memory 114 and executed by the one or more processors 112. Similarly, any reasonable number of virtual link drivers 131-139 may be supported by computing device 110.

As further shown in FIG. 1, application 121 is coupled to virtual link driver 131. This means that application 121 is using virtual link driver 131 to access a virtual link that has been partitioned from a physical network link as will be described in greater detail below. In some examples, virtual link driver 131 may provide layer 2 networking services to application 121. In some examples, virtual link driver 131 appears to application 121 as if it is providing a dedicated physical network link for use by application 121. Similarly, application 129 is coupled to virtual link driver 139 and virtual link driver 139 provides networking services to application 129 that may be similar to those provided by virtual link driver 131 to application 121. Although the relationship between applications 121-129 and virtual link drivers 131-139 is shown as a one-to-one relationship, other relationships are possible. In some examples, an application may use the services of two or more virtual link drivers. In some examples, two or more applications may use the services of a single virtual link driver.

Each of the virtual link drivers 131-139 is coupled to partition driver 140. Partition driver 140 is responsible for coordinating and aggregating the virtual links associated with each of the virtual link drivers 131-139 so that they may share a physical network link 150. As shown in FIG. 1, the physical network link 150 is coupled to network port 116, which is managed by partition driver 140. In some examples, partition driver 140 may provide buffering and/or other services so that outgoing network traffic on the virtual links does not collide and that incoming network traffic is directed to the corresponding virtual link. In some examples, partition driver 140 may also include support for bandwidth partitioning among the virtual links. In some examples, the bandwidth partitioning may allocate bandwidth on the physical network link to each of the virtual links using percentages of the total available bandwidth and/or by dedicated bandwidth amounts. In some examples, partition driver 140 may be included in the firmware of a NIC included in computing device 110.

Computing device 160 is similar to computing device 110. Computing device 160 includes one or more processors 162, memory 164, and network port 166. The one or more processors 162 may be similar to the one or more processors 112, memory 154 may be similar to memory 114, and/or network port 166 may be similar to network port 116. Like memory 114, memory 164 includes storage for a plurality of applications 171-179, a plurality of virtual link drivers 181-189, and/or a partition driver 190. As discussed above with respect to computing device 110, the applications 171-179 utilize virtual links provided by virtual link drivers 181-189. Coordination and aggregation of the virtual links provided by virtual link drivers 181-189 is handled by partition driver 190, which is coupled to network port 166 and provides sharing of physical network link 150 coupling computing device 160 to computing device 110. In some examples, each of the virtual links that is using physical network link 150 may be formed between a corresponding pair of virtual link drivers, with one virtual link driver in the pair being included in virtual link drivers 131-139 and the other being including in virtual link drivers 181-189. This means that the corresponding virtual link is being formed between virtual link drivers in computing devices 110 and 160, respectively, in much the same way traditional link drivers would form a driver pair at both ends of a physical network link.

The use of the virtual link drivers 131-139 and 181-189 and the partition drivers 140 and 190 provided added flexibility in the use of physical network link 150. Each of the applications 121-129 and 171-179 using any of the virtual links does so in a transparent fashion. This means that the applications 121-129 and 171-179 use the virtual links in the same way they would use a physical network link that is not partitioned. As previously discussed, use of the virtual links provides improved management of the bandwidth of physical network link 150 as each of the virtual links may be allocated separately controllable portions of the bandwidth of physical network link 150. Despite the transparency in the use of the virtual links, the mechanisms used to monitor and/or manage the operational status of physical network link 150 are not able to separately monitor and/or manage the operational status of the virtual links. Existing solutions such as Peripheral Component Interconnect (PCI) Single Root I/O Virtualization (SR-IOV) and Edge Virtual Bridging (EVB) of IEEE 802.1Qbg treat the link status of a physical network link monolithically and/or do not address the physical network link. This means that the link status of any of the virtual links that are using the physical network link are tied to the link status of the physical network link. Thus, all the virtual links are either operationally up or operationally down and cannot be managed and/or controlled separately.

Figure 2:
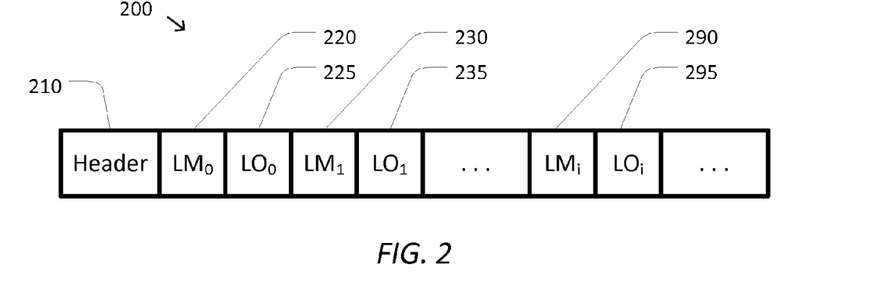
FIG. 2 is a simplified diagram of a virtual link status packet according to some embodiments.

FIG. 2 is a simplified diagram of a virtual link status packet 200 according to some embodiments. As shown in FIG. 2, virtual link status packet 200 includes a header 210 and a payload including a plurality of status values 220-295. Header 210 may include one or more fields that may be used to identify virtual link status packet 200 as a virtual link status packet and/or to distinguish virtual link status packet 200 from other packets that may be transmitted or received. The status values 220-295 include two status values for each of the virtual links supported in a physical network link. The status values include a local management (LM) status value and a local operational (LO) status value. The local management status value indicates that desired state for the corresponding virtual link. In most cases, the local management status value is set by the application and/or higher network layer using the virtual link. The local operational status value indicates a perceived state of the virtual link. In some examples, the local operational status value is a logical combination of the local management status value and the local management status value received from the device at the other end of the corresponding virtual link. In some examples, the local operational status value may be used to acknowledge agreement with the local management status value received from the device at the other end of the corresponding virtual link.

In some embodiments, the management and operational status values may assume one of two possible states. An Up state is used to indicate that the virtual link is considered to be up and operational. A Dn or down state is used to indicated that the virtual link is considered to be down and not presently usable. In some examples, the Up state may be represented by a bit value of 1 and the Dn state may be represented by a bit value of 0. In some examples, the Up state may be represented by a bit value of 0 and the Dn state by a bit value of 1. In some embodiments, other management and/or operational states may be possible.

In some embodiments, virtual link status packet 200 is assembled by a driver associated with the network port, of the local computing device, that is coupled to the physical network link that is partitioned into the corresponding virtual links. In some examples, the driver may be similar to partition driver 140 and/or 190. The driver collects the local management and local operational status values from the various virtual link drivers and packs them into the payload of virtual link status packet 200. As shown in FIG. 2, virtual link status packet 200 includes a local management status value for virtual link 0 ($LM_0$) 220, a local operational status value for virtual link 0 ($LO_0$) 225, a local management status value for virtual link 1 ($LM_1$) 230, a local operational status value for virtual link 1 ($LO_1$) 235, a local management status value for virtual link i ($LM_i$) 290, a local operational status value for virtual link i ($LO_i$) 295, etc. When virtual link status packet 200 is received by a corresponding driver at the other or remote end of the physical network link, the status values become remote status values from the perspective of the other end. Thus, the driver is aware of the local management and operational status values that are local to itself (the ones it transmits using virtual link status packet 200) and the remote management and operational status values that are remote to itself (the ones it receives in a virtual link status packet 200) from the other end of the physical network link. Using both the local and remote status values, a state of each of the virtual links may be determined at each end of the physical network link.

In some embodiments, virtual link status packet 200 may be transmitted over a physical network link using any commonly used mechanisms. In some examples, virtual link status packet 200 may be transmitted as a standalone packet. In some examples, virtual link status packet 200 may be transmitted in piggy-back fashion as an optional header, field, and/or type-length-value (TLV) field in a packet of another protocol. In some examples, the another protocol may be the S-Channel Discovery and Configuration Protocol (CDCP) of IEEE 802.1Qbg, the Link Layer Discovery Protocol (LLDP), and/or the like.

Figure 3:
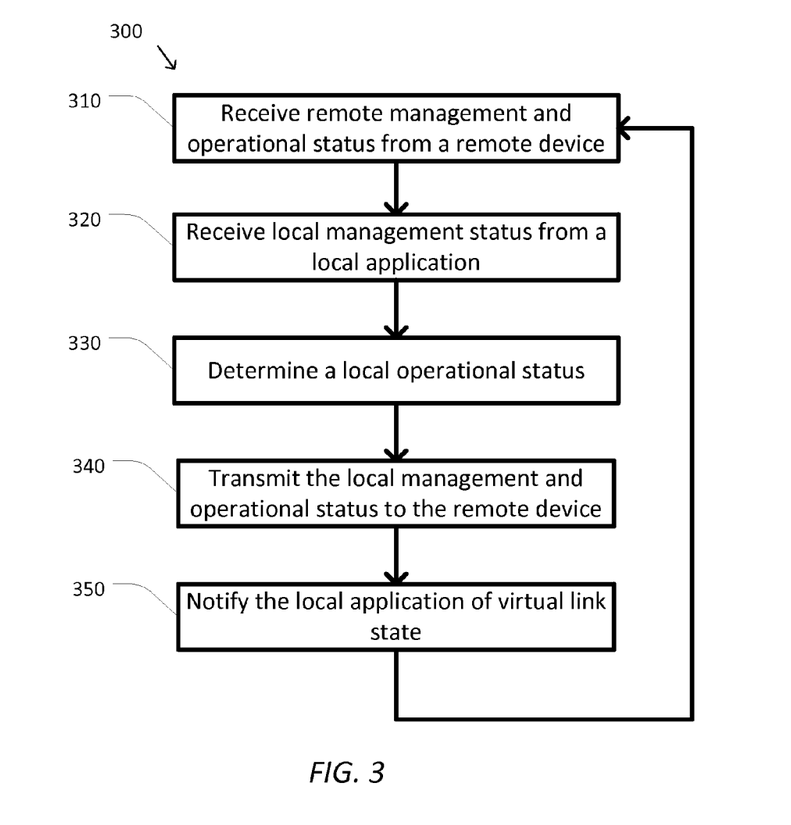
FIG. 3 is a simplified diagram of a method of virtual link state management according to some embodiments.

FIG. 3 is a simplified diagram of a method 300 of virtual link state management according to some embodiments. In some embodiments, one or more of the processes 310-350 of method 300 may be implemented, at least in part, in the form of executable code stored on non-transient, tangible, machine readable media that when run by one or more processors (e.g., the one or more processors 112 and/or 162) may cause the one or more processors to perform one or more of the processes 310-350. In some embodiments, method 300 may be performed in a virtual link driver, such as any of the virtual link drivers 131-139 and/or 181-189.

At a process 310, remote management and operational status are received from a remote device. To manage the status of a virtual link a local device and the remote device share information regarding a virtual link. During process 310, the local device may receive, from the remote device, the management and operational status value of the virtual link as perceived by the remote device. The remote management status value indicates the state of the virtual link desired by the remote device and the remote operational status value indicates the perceived state of the virtual link as observed by the remote device. In some examples, the remote management and operational status value may be provided by a virtual link driver in the remote device. In some examples, the remote management and operational status value may be received on a network port of the local device, processed by a port driver, and provided to the virtual link driver for the virtual link on the local device. In some examples, the port driver may be partition driver 140 and/or partition driver 190. In some examples, the remote management and operational status value may be included in a virtual link status packet, such as virtual link status packet 200. In some examples, the local driver may record the remote management and operational status values.

At a process 320, local management status is received from a local application. Use and operation of the virtual link may often be controlled by an application and/or a driver from a higher level of the network stack on the local device. In some examples, this local application may indicate to the virtual link driver the desired state of the virtual link as reflected in the local management status value. In some examples, the local application may use an application programming interface (API) or similar call to indicate the local management status value of the virtual link. For example, the local application may indicate that it desires to use the virtual link and its state should be Up. In some examples, the local application may be any of the applications 121-129 and/or 171-179. In some examples, the local management status may be alternatively received from a network administrator. In some examples, the local management status may be controlled by a state of other links relied upon by the local application desiring to exchange network traffic using the virtual link.

At a process 330, a local operational status is determined. The local operational status value indicates the perceived state of the virtual link from the perspective of the local device. In some examples, the local operational status value may be determined as a combination of the local management status value received during process 320 and the remote management status value received during process 310. In some examples, the local management status value and the remote management status value are logically combined to determine the local operational status value. In some examples, the local operational status value is Up when the local management status value is Up and the remote management status value is Up. This means that the local operational status value is Up when both the local device and the remote device desire the virtual link to be Up. In other cases, the local operational status value is determined to be Dn. In some embodiments, other combinations of the status values may be used to determine the local operational status value.

At a process 340, the local management and operational status are transmitted to the remote device. In order to share and/or acknowledge its understanding of the state of the virtual link, the local device may transmit the local management and operational status values to the remote device. In some examples, the local management and operational status values are transmitted to the virtual link driver in the remote device. In some examples, the local management and operational status values may be communicated to the partition driver using an API call, or similar mechanism, where they are added to a virtual link status packet, such as virtual link status packet 200, and transmitted to the remote device using the physical network link.

At a process 350, the local application is notified of the virtual link state. The local application using the virtual link is notified of the state of the virtual link. In some examples, the state of the virtual link may be Up when the remote management status value is Up, the remote operational status value is Up, the local management status value is Up, and the local operational status value is Up. In some examples, the state of the virtual link may be Dn for other combinations of the remote management status value, the remote operational status value, the local management status value, and the remote operational status value. In some examples, the local application may be notified by the virtual link driver using a callback and/or other similar mechanism. In some examples, the virtual link driver may report the virtual link state to a status variable in a shared memory on the local device. In some example, the local application may be notified of the virtual link state when it polls the virtual link driver using an API call and/or similar mechanism.

Figure 4:
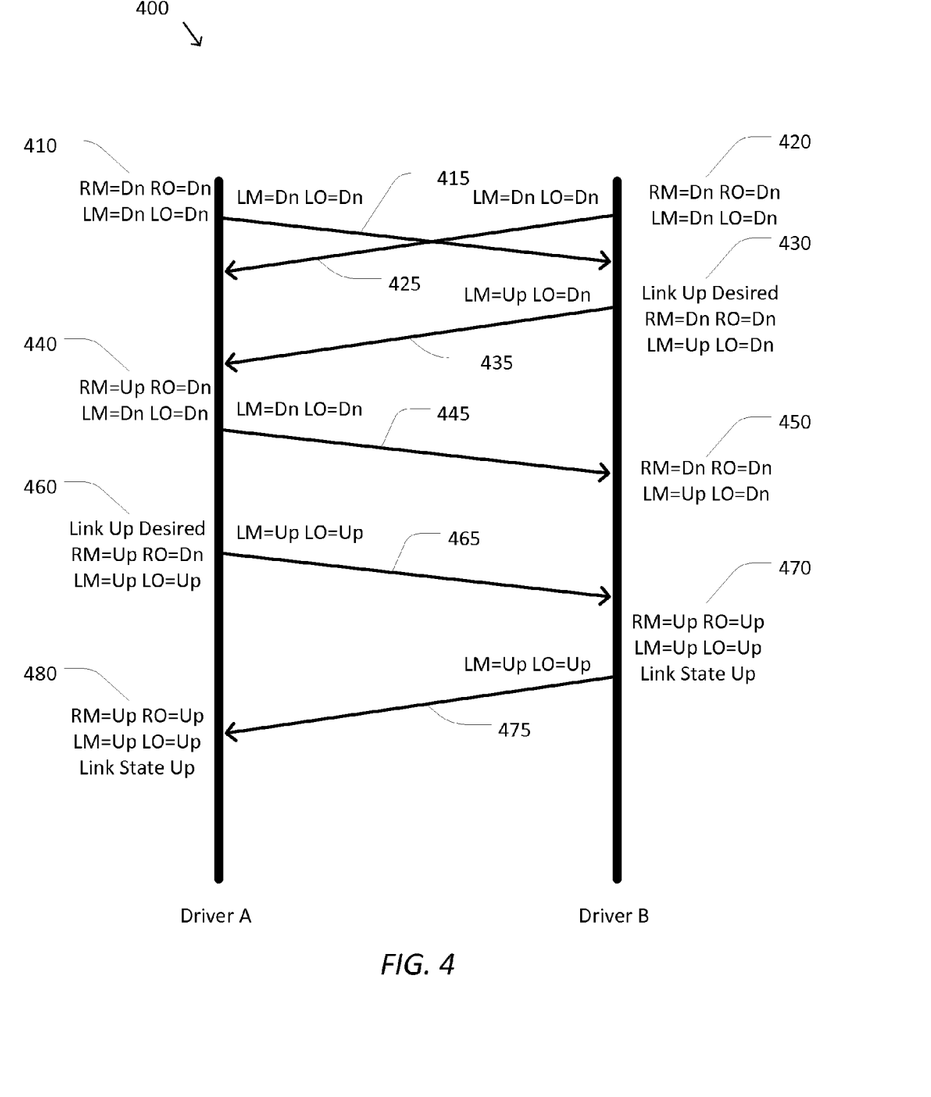
FIG. 4 is a simplified diagram of use of the method of FIG. 3 to manage a virtual link according to some embodiments.

FIG. 4 is a simplified diagram of use of method 300 to manage a virtual link according to some embodiments. As shown in FIG. 4, two drivers, driver A and driver B, at the two ends of a virtual link are shown demonstrating the exchange of management and operational status value to manage a state of a virtual link. In some examples, driver A and driver B may be any of virtual link drivers 131-139 and/or 181-189. To manage the state of the virtual link, both driver A and driver B each manage four status values associated with the state of the virtual link. The four status values include a remote management status value (RM), a remote operational status value (RO), a local management status value (LM), and a local operational status value (LO). In general, each of these four status values represents elements of the state of the virtual link from the perspective of the respective driver. In some examples, the remote management and operational status values correspond to those status values last received from the driver at the remote end of the virtual link and the local management and operational status values correspond to those status values as known by the driver for its end of the virtual link. Thus, the remote status values at driver A correspond to the local status values transmitted by driver B and the remote status values at driver B correspond to the local status values transmitted by driver A. As shown in FIG. 4, time is generally depicted as flowing from older moments in time at the top of the figure to newer moments in time at the bottom of the figure. The directed arrows represent an exchange of information via transmission and reception as shown by the direction of the arrow.

At time 410, driver A notes that all four status values are Dn. From the perspective of driver A this means that its local management status value (LM) or desired state of the virtual link is down, its local operational status value (LO) or perceived state of the virtual link is down, the remote management status value (RM) or desired state of the virtual link reported by driver B is down, and the remote operational status value (RO) or perceived state of the virtual link reported by driver B is down. In some examples, setting all four of the status values to Dn may represent default status values for the virtual link before any status values are exchanged. Using its version of process 340, driver A may periodically transmit its local management and operational status values to driver B. This is shown by the transmission of LM=Dn and LO=Dn from driver A to driver B in a status update 415.

At time 420, driver B similarly notes that all four status values are Dn. Driver B may periodically transmit its LM and LO to driver A, using process 340 of driver B, as shown in a status update 425. When driver B uses process 310 to receive status update 415 from driver A, driver B interprets the local status values transmitted by driver A as the corresponding remote status values RM and RO. Using process 330, the LO of driver B remains Dn because the received RM from driver A and the LM of driver B are both Dn. Driver A responds similarly when it receives status update 425.

At time 430, driver B is notified that the desired state of the virtual link is Up. In some examples, driver B may be notified by the local application communicating with driver B that the local application would like to make the virtual link operational. In some examples, the local application may be any of the applications 121-129 and/or 171-179. In some examples, driver B may be instructed to bring the virtual link to Up by a network administrator. In some examples, the desired state of the virtual link may be controlled by a state of other links relied upon by any of the applications 121-129 and/or 171-179 desiring to exchange network traffic using driver B. In some examples, driver B may receive this notification during its process 320. As a result of this notification, driver B changes LM to Up indicating that driver B desires the virtual link state to be up and operational. Driver B may then use process 340 to transmit the change in LM to driver A using a status update 435. In some examples, status update 435 may be sent as a direct response to the change in LM. In some examples, status update 435 may be sent during a periodic status update exchange.

At time 440, driver A receives status update 435 from driver B and records the status values included therein as RM=Up RO=Dn. Driver A, however, does not record any change in its LO status value because the LM for driver A remains Dn. In some examples, driver A may respond to status update 435 by transmitting a status update 445 indicating that driver A still has LM=Dn LO=Dn. In some examples, status update 445 may be sent during a periodic status update exchange. At time 450, driver B receives status update 445 and continues to note RM=Dn RO=Dn as reported in status update 445.

At time 460, driver A is notified that the desired state of the virtual link is Up. In some examples, driver A may be notified by the local application communicating with driver A that the local application would like to make the virtual link operational. In some examples, the local application may be any of the applications 121-129 and/or 171-179. In some examples, driver B may be instructed to bring the virtual link to Up by a network administrator. In some examples, the desired state of the virtual link may be controlled by a state of other links relied upon by any of the applications 121-129 and/or 171-179 desiring to exchange network traffic using driver B. In some examples, driver A may receive this notification during its process 320. As a result of this notification, driver A changes LM to Up indicating that driver A desires the virtual link state to be up and operational. Because RM=Up, driver A also changes LO to Up. Driver A may then use process 340 to transmit the change in LM and LO to driver B using a status update 465. In some examples, status update 465 may be sent as a direct response to the change in LM and/or LO. In some examples, status update 465 may be sent during a periodic status update exchange.

At time 470, driver B receives status update 465 and notes RM=Up RO=Up. Because LM is also Up at driver B, driver B changes LO to Up using its process 330. As a further result, driver B also notifies its local application, using process 350 of driver B, that the virtual link is now up and operational and may be used to exchange network traffic. Driver B may further acknowledge the change in virtual link state with driver A by transmitting a status update 475 with LM=Up LO=Up to driver A.

At time 480, driver A may receive status update 475 and note that RM=Up RO=Up. Because RO is now Up, driver A may conclude that both it and driver B agree that the virtual link is up and operational and may consequently notify its local application, using its process 350, of this change in virtual link state and that the virtual link may be used to exchange network traffic.

As discussed above and further emphasized here, FIG. 4 is merely an example which should not unduly limit the scope of the claims. One of ordinary skill in the art would recognize many variations, alternatives, and modifications. In some embodiments, drivers A and/or B may not transmit and/or receive status updates directly from the counterpart driver. In some examples, the status values may be transmitted and/or received by other drivers; with drivers A and/or B being notified of the status values by the other drivers. In some embodiments, drivers A and/or B may exchange additional status updates with virtual link status values that are not shown in FIG. 4. In some examples, drivers A and/or B may periodically exchange additional status updates between any of the times depicted in FIG. 4. In some embodiments, the status update exchange may be used to change the state of the virtual link to down. In some examples, the local application communicating with driver A may instruct driver A to change the virtual link state to down. Driver A may respond by setting its LM and LO values to Dn and then transmit a status update with LM=Dn LO=Dn to driver B. When driver B receives this status update it may record them as RM=Dn and RO=Dn and then change LO to Dn. Driver B may then acknowledge the change in the state of the virtual link by transmitting a status update with LM=Up LO=Dn to driver A. When driver A receives this status update it may record the status values as RM=Up RO=Dn. At this point the link state and the drivers are at values similar to those at times 440 and 450.

In some embodiments, changes may be made to the remote management and operational status values based on timers. In some examples, drivers A and/or B may start and/or restart timers whenever they transmit and/or receive a status update. In some examples, when a respective timer times out before a subsequent status update is received, the corresponding driver may revert its RM and RO values to Dn indicating that the virtual link status from the perspective of the other driver is not known. In some examples, the reversion of RM and RO values to Dn may result in LO being changed to Dn as well.

Figure 5:
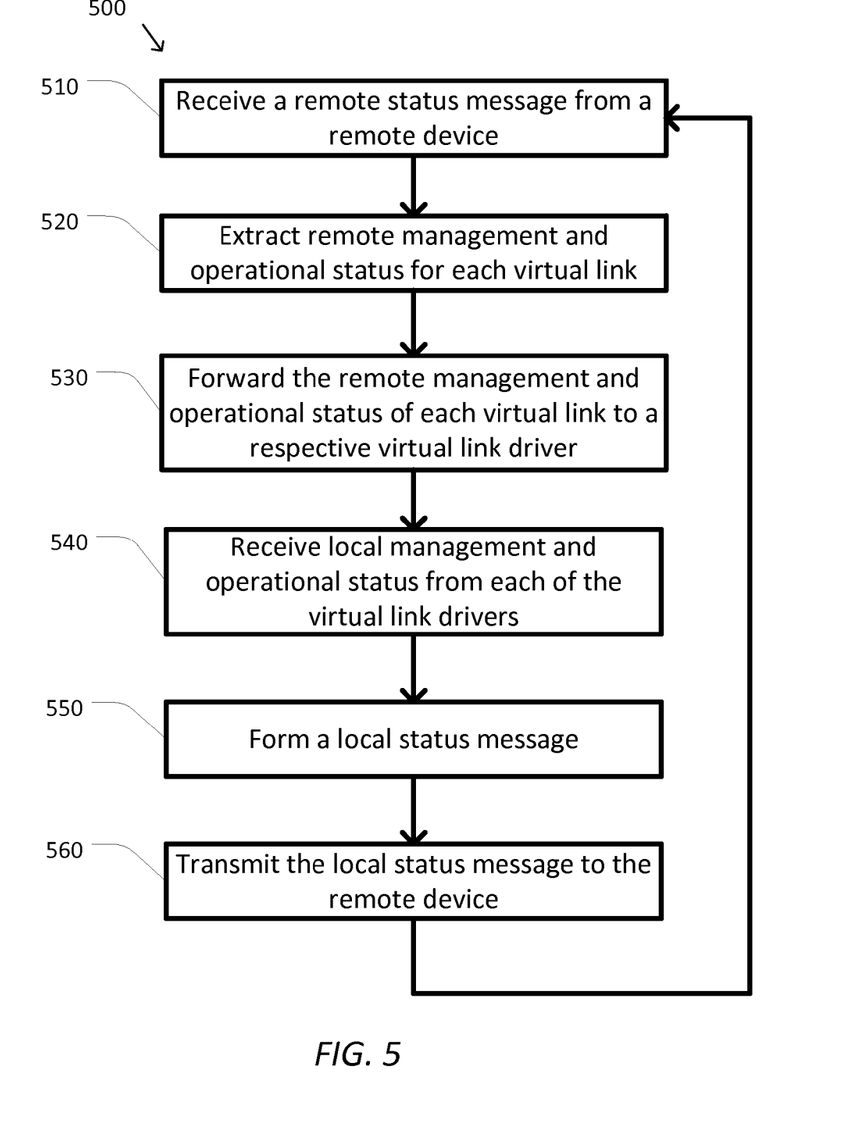
FIG. 5 is a simplified diagram of a method of exchanging virtual link status information according to some embodiments.

FIG. 5 is a simplified diagram of a method 500 of exchanging virtual link status information according to some embodiments. In some embodiments, one or more of the processes 510-560 of method 500 may be implemented, at least in part, in the form of executable code stored on non-transient, tangible, machine readable media that when run by one or more processors (e.g., the one or more processors 112 and/or 162) may cause the one or more processors to perform one or more of the processes 510-560. In some embodiments, method 500 may be performed in a partition driver, such as any of the partition drivers 140 and/or 190.

At a process 510, a remote status message is received from a remote device. A driver in a local device at the local end of a physical network link may receive the remote status messages from a corresponding driver in the remote device. In some examples, the remote status message may include state information on one or more virtual links into which the physical network link is partitioned. In some examples, the state information may correspond to the desired and/or perceived state of the virtual links as noted by respective virtual link drivers, such as virtual link drivers 131-139 and/or 181-189, in the remote device. In some examples, the remote status message may include a virtual link status packet, such as virtual link status packet 200. In some examples, the remote status message may be received as a header, field, TLV field, and/or the like in another message being transmitted from the local device to the remote device. In some examples, the another message may be part of the CDCP, LLDP, and/or the like.

At a process 520, remote management and operational status for each virtual link is extracted. As discussed above with respect to FIGS. 3 and 4, when status values are received at a local device from a remote device, the status values that are local to the remote device become remote to the local device. The remote management and the remote operational status values for each virtual link are extracted from the remote status message received during process 510. In some examples, each of the remote management status values may correspond to the desired state of the corresponding virtual link and/or each of the remote operational status values may correspond to the perceived state of the corresponding virtual link. In some examples, when the remote status message includes virtual link status packet 200, each $LM_i$ and $LO_i$ value may be extracted from virtual link status packet 200 as corresponding remote management and remote operational status values, respectively, for virtual link i.

At a process 530, the remote management and operational status of each virtual link is forwarded to a respective virtual link driver. Each respective virtual link driver may receive the remote management and operational status values, extracted during process 520, for the virtual link that corresponds to the respective virtual link driver. Thus, the respective virtual link driver for virtual link i receives the remote management and operational status value for virtual link i. In some examples, the respective virtual link driver may receive the forwarded remote management and operational status values using its corresponding process 310.

At a process 540, local management and operational status is received from each of the virtual link drivers. In some examples, the partition driver may receive the local management and operational status values of each of the virtual links from corresponding virtual link drivers. In some examples, the virtual link drivers may transmit the local management and operational status values to the partition driver using process 340. In some examples, each of the local management status values may correspond to the desired state of the corresponding virtual link and/or each of the local operational status values may correspond to the perceived state of the corresponding virtual link.

At a process 550, a local status message is formed. Using the local management and operational status values received during process 540, the partition driver may form the local status message. In some examples, the local management and operational status values for virtual link i are packed into the local status message at the locations designated for virtual link i. In some examples, the local status message may include a virtual link status packet, such as virtual link status packet 200.

At a process 560, the local status message is transmitted to the remote device. In some examples, the local status message is transmitted to the corresponding driver in the remote device from which the remote status message was received during process 510. In some examples, the local status message may be a stand-alone message. In some examples, the local status message may be inserted piggy-back fashion as a header, field, TLV field, and/or the like in another message being transmitted from the local device to the remote device. In some examples, the another message may be part of the CDCP, LLDP, and/or the like. In some examples, the corresponding driver in the remote device may receive the local status message as a remote status message in a corresponding process 510. In some examples, the local status message may be transmitted periodically. In some examples, the local status message may be transmitted on an as needed basis, such as whenever any of the local management and/or operational status values changes. After completion of process 560, method 500 may repeat again so that remote and local status messages may continue to be exchanged and processed.

As discussed above and further emphasized here, FIGS. 3-5 are merely examples which should not unduly limit the scope of the claims. One of ordinary skill in the art would recognize many variations, alternatives, and modifications. In some embodiments, responsibility for managing the state of each of the virtual links in a physical network link may be distributed differently among the various drivers. In some examples, method 300 may be performed in the partition driver with the partition driver determining whether each of the respective virtual links is up or down. In some examples, the virtual link driver may provide the local management status value to the partition driver during process 320 and may receive the virtual link state from the partition driver during process 350. In some examples, partition driver may forward the remote management and operational status values during process 530 and receive the local management and operational status values during process 540 from its own handlers rather than forward and/or receive the status values from the virtual link drivers. In some examples, each of the handlers may manage a respective virtual link using process 300.

Some embodiments of the computing devices 110 and/or 160 may include non-transient, tangible, machine readable media that include executable code that when run by one or more processors may cause the one or more processors (e.g., the one or more processors 112 and/or 162) to perform the processes of methods 300 and/or 500 as described above. Some common forms of machine readable media that may include the processes of methods 300 and/or 500 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of managing a virtual link in a first device, the method comprising:
    receiving a first status update associated with the virtual link from a second device, the first status update including a first management status value and a first operational status value;
    determining a second management status value associated with the first device;
    determining a second operational status value based on information associated with the first status update and the second management status value;
    transmitting a second status update for the virtual link to the second device, the second status update including the second management status value and the second operational status value; and
    determining a state of the virtual link based on information associated with the first management status value, the first operational status value, the second management status value, and the second operational status value;
    wherein:
        the first management status value indicates a first desired state of the virtual link from a perspective of the second device;
        the second management status value indicates a second desired state of the virtual link from a perspective of the first device;
        the first operational status value indicates a first perceived state of the virtual link from the perspective of the second device;
        the second operational status value indicates a second perceived state of the virtual link from the perspective of the first device;
        the first device is configured to be coupled to the second device using a physical network link;
        the physical network link is configured to be partitioned into a plurality of first virtual links; and
        the plurality of first virtual links includes the virtual link.

2. The method of claim 1, further comprising notifying an application or a driver in the first device of the state of the virtual link.

3. The method of claim 1 wherein determining the second management status value associated with the first device comprises receiving the second management status value from an application or a driver in the first device.

4. The method of claim 1 wherein determining the second operational status value comprises logically combining the first management status value and the second management status value.

5. The method of claim 1 wherein:
    the first management status value is selected from a group consisting of up and down;
    the first operational status value is selected from a group consisting of up and down;
    the second management status value is selected from a group consisting of up and down;
    the second operational status value is selected from a group consisting of up and down; and
    the state of the virtual link is selected from a group consisting of up and down.

6. The method of claim 5 wherein determining the second operational status value comprises setting the second operational status value to up when the first management status value is up and the second management status value is up.

7. The method of claim 5 wherein determining the state of the virtual link comprises setting the state of the virtual link to up when the first management status value is up, the first operational status value is up, the second management status value is up, and the second operational status value is up.

8. The method of claim 5, further comprising:
    encoding up using a logical 1; and
    encoding down using a logical 0.

9. The method of claim 1 wherein receiving the first status update associated with the virtual link from the second device comprises:
    receiving a virtual link status packet from the second device; and
    extracting the first management status value and the first operational status value from the virtual link status packet.

10. The method of claim 9 wherein the virtual link status packet further includes third management status values and third operational status values associated with others of the plurality of first virtual links.

11. The method of claim 9 wherein the virtual link status packet is included as a header, a field, or a type-length-value (TLV) field of a message associated with a network protocol.

12. The method of claim 11 wherein the network protocol is selected from a group consisting of a S-Channel Discovery and Configuration Protocol (CDCP) and a Link Layer Discovery Protocol (LLDP).

13. The method of claim 9, further comprising receiving the virtual link status packet periodically.

14. The method of claim 1 wherein transmitting the second status update for the virtual link to the second device comprises:
    assembling a virtual link status packet including the second management status value, the second operational status value, and third management status values and third operational status values associated with others of the plurality of first virtual links; and transmitting the virtual link status packet to the second device.

15. A computing device comprising:
   one or more processors;
   a memory coupled to the one or more processors;
   a first driver stored in the memory and being executed by the one or more processors; and
   a network port configured to couple the computing device to a remote device using a physical network link, the physical network link being configured to be partitioned into a plurality of first virtual links including a second virtual link;
   wherein the first driver is configured to:
      receive a remote status update associated with the second virtual link from the remote device, the remote status update including a remote management status value and a remote operational status value;
      receive a local management status value associated with the computing device;
      determine a local operational status value based on information associated with the remote status update and the local management status value;
      transmit a local status update for the second virtual link to the remote device, the local status update including the local management status value and the local operational status value; and
      determine a state of the second virtual link based on information associated with the remote management status value, the remote operational status value, the local management status value, and the local operational status value;
   wherein:
      the remote management status value indicates a first desired state of the second virtual link from a perspective of the remote device;
      the local management status value indicates a second desired state of the second virtual link from a perspective of the computing device;
      the remote operational status value indicates a first perceived state of the second virtual link from the perspective of the remote device; and
      the local operational status value indicates a second perceived state of the second virtual link from the perspective of the computing device.

16. The computing device of claim 15 wherein the first driver is further configured to notify an application or a second driver of the state of the second virtual link.

17. The computing device of claim 15 wherein the first driver is further configured to determine the local operational status value by setting the local operational status value to up when the remote management status value is up and the local management status value is up.

18. An information handling system comprising:
   a first computing device comprising one or more first processors, a first memory coupled to the one or more first processors, a first driver stored in the first memory and being executed by the one or more first processors, and a first network port;
   a second computing device comprising one or more second processors, a second memory coupled to the one or more second processors, a second driver stored in the second memory and being executed by the one or more second processors, and a second network port; and
   a physical network link coupling the first network port and the second network port;
   wherein:
      the physical network link is configured to be partitioned into a plurality of first virtual links including a second virtual link;
      the first driver is configured to transmit a first status update associated with the second virtual link, the first status update including a first management status value and a first operational status value; and
      the second driver is configured to:
         receive the first status update;
         receive a second management status value associated with the second computing device;
         determine a second operational status value based on information associated with the first status update and the second management status value;
         transmit a second status update for the second virtual link to the first computing device, the second status update including the second management status value and the second operational status value;
         determine a state of the second virtual link based on information associated with the first management status value, the first operational status value, the second management status value, and the second operational status value;
      the first management status value indicates a first desired state of the second virtual link from a perspective of the first computing device;
      the second management status value indicates a second desired state of the second virtual link from a perspective of the second computing device;
      the first operational status value indicates a first perceived state of the second virtual link from the perspective of the first computing device; and
      the second operational status value indicates a second perceived state of the second virtual link from the perspective of the second computing device.

* * * * *